3,224,884
TOPPING MIX
Morton Pader and Sol D. Gershon, West Englewood, N.J., assignors to Lever Brothers Company, New York, N.Y., a corporation of Maine
No Drawing. Filed Oct. 1, 1962, Ser. No. 227,566
16 Claims. (Cl. 99—139)

The present invention relates to a composition for preparing a topping mix, and, more particularly, it is concerned with a dry topping mix.

It is known that certain compositions have properties similar to whipping cream after they are mixed with milk or water. These compositions can be pastes or free-flowing powders. The powders are preferred, since they are easy to handle and since they generally undergo less change during long-term storage. A typical prior art composition in powder form has about 30–80% fat, 2–35% sugar, 5–30% non-fat milk solids and 3–20% of an emulsifier. This composition is generally prepared by forming an aqueous emulsion and subsequently drying the emulsion to provide a powdered topping mix.

In the past, the prior art topping mixes have caused certain problems. For example, they have produced a relatively low overrun, e.g., less than 200%, or they have lacked the organoleptic properties of toppings based on whipping cream. Furthermore, the foams produced from the prior art formulations are in some instances unstable on standing, i.e., the foam cells agglomerate to form large bubbles, resulting in an undesirable coarse, spong-like structure. Additionally, some prior art products yield, on whipping, foams which tend to be sensitive to over whipping and break down or become curdy in texture if whipped excessively.

For commercial acceptability, a whipped topping composition must retain its desirable reconstituted properties over long periods of time under conditions of normal distribution and sale. Preferably, the composition should not require refrigeration, and for this reason dry topping mixes are advantageous. Spray-drying is one of the most economical means for obtaining such dry mixes in a free-flowing form.

Little is known about the requirements of a powder comprising fat, emulsifiers, and proteins with respect to the ideal physical state of these components for good whipping and for maintenance of whippability during storage of the powder. It is believed that the state of the emulsion prior to spray-drying, i.e., the fat globule size, the distribution of the protein, the distribution of the emulsifier, and other factors can influence the performance characteristics of the final dried product. The ready obtention of an emulsion (prior to spray drying) which is stable and resistant to change while awaiting being fed to the spray drier is thus highly desirable. Presently known emulsions of this type, however, tend to readily separate into aqueous and fatty phases, and the emulsion must be maintained by physical means such as constant agitation and the like. As a result, unless the process is carefully controlled, one obtains variability in the product, experiences difficulty in spray drying evenly and uniformly, or even may obtain an inferior product.

As an additional problem, dry topping mixes do not have indefinite shelf life. Even though they remain wholesome, they lose their ability to whip during storage. Little is known about the mechanism of this change. In some prior art spray-dried toppings, loss of whippability during storage has been a severe problem.

It has now been found that these and other problems are alleviated by preparing a topping composition which comprises a base fat, a sweetening agent, a water dispersible protein, and a combination of emulsifying agents in which one of the emulsifying agents is a mixture of phosphoric acid esters of glycerides. The other emulsifying agent or agents of the combination can be any which are known in the spray dried topping mix art. One suitable combination of emulsifying agents employed in this invention comprises (1) a lactylated glycerol ester of a saturated fatty acid selected from the group consisting of palmitic acid, stearic acid and mixtures thereof; (2) a compound selected from the group consisting of an ester of a polyhydric alcohol and an unsaturated fatty acid and a lactylated ester of a polyhydric alcohol and an unsaturated fatty acid; and (3) a mixture of phosphoric acid esters of mono- and diglycerides. Another satisfactory combination has the following emulsifying agents therein: a partial ester of a glycol and a higher saturated fatty acid, e.g., propylene glycol monostearate; and a mixture of the aforementioned phosphoric acid esters.

The aforementioned ingredients are combined in an aqueous emulsion, which is subsequently spray-dried to provide a free-flowing powder having superior handling characteristics. An excellent topping is obtained after reconstituting this powder with milk or water and subsequently whipping.

If employed, glyceryl lactopalmitates or glyceryl lactostearates (about 4% to about 20% by weight of the complete composition) are used in this invention in conjunction with from about 0.4% to about 2% by weight of a glyceryl lactooleate, a glyceryl monooleate, a glyceryl dioleate or mixtures thereof. It has been found in some instances that a composition which contains a combination of lactopalmitates or lactostearates with one of the unsaturated fatty acid esters is superior to a composition with only glycerol lactopalmitate therein. The glyceryl lactopalmitates or lactostearates employed herein are formed by lactylating a mono- and diglyceride concentrate prepared from sources rich in palmitic and/or stearic acids. A commercial lactopalmitate preparation which is preferred is Drumulse 9169, supplied by E. F. Drew Co. While the lactopalmitates are preferred, the lactostearates may also be satisfactory, and mixtures of the two can be used, as well as mixtures containing lower or higher fatty acid residues.

The esters of polyhydric alcohols and unsaturated fatty acids and the lactylated esters of polyhydric alcohols and unsaturated fatty acids which can be used in this invention include glyceryl lactooleate, glyceryl monooleate and glyceryl dioleate. These materials do not provide a satisfactory product if used as the major emulsifier, but markedly shorten whipping time, increase overrun and distinctly improve the whipped product texture if used as a supplement to the lactopalmitate and/or lactostearate. An example of a suitable glyceryl lactooleate is Drumulse 9327 which is sold by E. F. Drew Co. and which is prepared by lactylating a mono-and diglyceride concentrate made from oleic acid.

The phosphoric acid esters of mono- and diglycerides which are used in combination with the other emulsifiers can be formed by reacting a derivative of phosphorus separately with a glyceride having a saturated ester residue and with a glyceride having an unsaturated ester residue. However, these esters can also be provided from a single glyceride source. The derivatives of phosphorus within the purview of this invention are as follows: phosphorus pentoxide, pyrophosphoric acid, meta-phosphoric acid, phosphorus halides, ethyl meta-phosphate, phosphorus trioxides, phosphorus pentachloride, phosphorus oxychloride and the like. Process techniques which have been previously used to provide esters from phosphorus derivatives are described in U.S. Patent Nos. 2,026,785, 2,177,983 and 2,177,984, the disclosures of which are incorporated herein by reference.

The glycerides used to prepare the phosphoric acid esters can be pure monoglycerides, a mixture of pure monoglycerides, or a mixture of mono- and diglycerides.

It is possible according to the invention to use a combination of two phosphoric acid esters—one in which the starting fatty acid is essentially saturated and the other in which the starting fat has an iodine number of about 50 or higher, i.e. one which is unsaturated. These two types of esters may be employed in a ratio of about 1:1, with the total ester concentration being about 0.05% to 1%, preferably 0.1 to 0.5%. However, satisfactory results are also obtained if either type of phosphoric acid ester is employed alone. For example, it is operative to use only an ester which is prepared from partially hydrogenated cottonseed oil, and it is also operative to use only an ester which is prepared from a mixture of molecularly distilled hydrogenated lard and cottonseed oil monoglycerides.

In the present invention, the phosphoric acid ester with the saturated acid residue and the phosphoric acid ester with the unsaturated acid residue may be prepared separately. The results are also satisfactory if a glyceride with a saturated acid residue and a glyceride with an unsaturated acid residue are mixed together and a phosphoric acid ester thereafter prepared from this admixture. Accordingly, the iodine value of the mono- and diglycerides used to prepare the phosphoric acid esters can vary over a wide range, and good results are obtained from mono- and diglycerides derived from either completely hydrogenated fats and oils or liquid oils. An oil hardened to about 65 I.V. is preferred, since off-flavor problems may be encountered with extremely high I.V. oils. Extremely low I.V. products are not too satisfactory, since a high temperature must be maintained to keep the ester intermediates in a molten state.

The emulsifying system may consist of the phosphoric acid esters in combination with about 4 to 20% by weight of the whole composition of a partial ester of a glycol and a higher fatty acid. These esters are prepared by reacting any di-hydric alcohol with higher fatty acids, or fats containing fatty acids. One of the following specific procedures is generally employed: the methylation of fats and the subsequent reaction of the methyl esters with glycol; or the direct esterification of glycol and fatty acids. The aforementioned esterification usually forms, firstly, mono-esters, each containing one hydroxyl and one fatty acid, and secondly, di-esters with both hydroxyls being substituted with the fatty acid radicals. The mono-esters are preferred over the di-esters; however, a mixture of mono- and di-esters is satisfactory. The fatty acid reactant preferably is saturated and has a chain length ranging from 12 to 22 carbon atoms, e.g., lauric myristic, palmitic, stearic, behanic and arachidic acids. Specific partial esters which are suitable for this invention are propylene glycol mono-stearate, propylene glycol mono-palmitate, propylene glycol mono-laurate, and propylene glycol mono-myristate, alone, or in admixture with the comparable di-esters.

The aforementioned emulsifiers are advantageously used with about 30% to 55% of base fat, about 25% to 45% of a sweetening agent, and about 6% to 11% of protein.

A fat is incorporated into the topping mix to impart the desired creamy-mouth feel. Fats for this invention should have a capillary melting point in the range of about 35° to 40° C. Suitable fats are soybean oil having an iodine value of about 80, partially hydrogenated cottonseed oil, coconut oil, and mixtures thereof.

The use of lecithin (1 to 3%) as an ingredient in the composition of this invention provides a product with improved texture. Suitable lecithin materials include natural soybean lecithin, hydroxylated lecithins, and the ethanol insoluble fraction of natural lecithins. The latter product is preferred.

A sugar is generally the sweetening agent used in the present invention. Sucrose is the preferred compound. The amount of sweetening agent varies according to taste. Further, a portion of the sugar can be replaced by an artificial sweetening agent such as saccharine or a cyclamate, providing sufficient sugar remains to provide a spray dried product having an acceptable physical structure.

A caseinate, preferably sodium caseinate, is generally employed herein as the protein.

Emulsions prepared for spray-drying according to the present invention are quite stable, and maintain their physical state without appreciable change for prolonged periods of time, even longer than about 4 hours. This facilitates greatly the spray-drying operation. Batches of emulsion can be made ahead of time, and no special precautions need be taken to ensure that the beginning and end of an emulsion batch are alike in composition and physical state. One is assured of a uniform product from beginning to end of a batch without resorting to costly equipment to ensure this result by physical means. Thus, while dry toppings can be prepared in the absence of the phosphoric acid esters of mono- and diglycerides, it is necessary in that case to take extreme precautions to keep the spray tower feed stock in proper emulsified condition.

It is preferred, according to this invention, to maintain the pH of the composition within the range where optimum dispersion of the protein is obtained. For caseinate, the optimum pH range is about 6.5 to 7.5.

The incorporation of phosphoric acid esters of mono- and diglycerides also results in spray-dried powders with increased storage stability. Whether this is an effect of the material on the emulsion prior to spray drying or on the state of the final, dry powder is not known. Nonetheless, the effect is quite apparent, and of great significance from the point of view of commercial suitability of the topping mix.

The topping composition containing the aforementioned ingredients can be whipped before or after spray-drying. The whipping characteristics are approximately the same whether the composition is prepared as a 60% solids concentrate and thereafter diluted to about 35% solids with cold milk before whipping, or whether it is spray-dried, diluted with cold milk to 35% solids and subsequently whipped. In order to reconstitute the compositions of the present invention, about 3.8 to about 4.2 fluid ounces 112–124 of milk or water are added to about 2.2 to 2.7 ounces (62–77 g.) of spray-dried powder.

Thus, in accordance with the present invention, it is now possible to provide an improved whipped topping from a dry topping mix. Firstly, the manufacture of the mix, e.g., the spray-drying operation, is simplified. Secondly, the dry powder, when mixed with liquid, whips rapidly, i.e., in less than about 3–4 minutes, to a stable foam with an overrun equal to or higher than whipped cream. Thirdly, the whipped topping has good structure; that is, it is firm and melts down properly in the mouth. Fourthly, the dry powder has improved stability of its whipping characteristics under the storage conditions generally encountered in distribution and warehousing.

The following examples are submitted to illustrate but not to limit this invention. Unless otherwise indicated, all parts and percentages in the specification are based upon weight.

*Example I*

A topping mix was prepared from the ingredients indicated herebelow.

| Ingredients: | Parts |
| --- | --- |
| Glyceryl lactopalmitate | 7.0 |
| Glyceryl lactooleate | 0.5 |
| Peanut oil, 65 I.V. | 41.7 |
| Phosphoric acid esters of 65 I.V. cottonseed oil mono-diglycerides (PAEM) | 0.2 |
| Lecithin | 1.0 |

Example I—Continued

| Ingredients—Continued | Parts |
|---|---|
| Fat-soluble color | 0.3 |
| Sodium caseinate | 8.0 |
| Vanilla flavor | 0.037 |
| Sucrose | 41.263 |

A blend of 65.12 parts deodorized 65 I.V. peanut oil, 32.55 parts glyceryl lactopalmitate, and 2.33 parts glyceryl lactooleae was prepared. This blend was subsequently treated for one hour at 50° to 55° C. with anhydrous sodium carbonate (22% by weight based on the oil-emulsifier blend). After vigorous agitation, the blend was filtered and deodorized for one hour at 150° C. under vacuum.

The aforementioned peanut oil was prepared by hydrogenation with a nickel catalyst at 200° C. to 65 I.V. and by deodorization for four hours at 185° C. under vacuum. The aforementioned carbonate-treated blend and the remainder of the hydrogenated peanut oil were admixed and the color, PAEM and lecithin were subsequently added at a temperature of 60 to 65° C. to provide a hot oil phase.

Sucrose and sodium caseinate were dry-blended and then dispersed in water at about 25° C. to form a 25% solids dispersion.

The hot oil phase was gradually added to the aqueous sucrose-caseinate in a stainless steel tank in conjunction with vigorous agitation. The resulting mixture was homogenized in a 2-stage Manton-Gaulin homogenizer (1000 p.s.i.g., 1st stage; 500 p.s.i.g, 2nd stage) to provide in emulsion. This emulsion was subsequently spray-dried in a tower (Western precipitation, Type N) with the following conditions: emulsion feed rate, 0.28 lb./min.; inlet air temperature, 425° F.; exit air temperature, 190–205° F.; and atomizing air pressure, 40 p.s.i.g. A free-flowing powder was obtained with 0.8–1.3% moisture. This powder was passed through a 20-mesh sieve and subsequently dry-blended with the flavor. The flavored product was stored for 5 days at 30–40° F. and then stored at room temperature.

After this storage, 67.5 gms. of the powder were whipped with ½ cup of cold milk, using a Sunbeam Mixmaster (electric household mixer). The rate and extent of whipping were determined by measuring the overrun at different intervals. The results are as follows:

| Time of whipping (min.): | Overrun (percent) |
|---|---|
| 2 | 210 |
| 3 | 255 |
| 4 | 275 |

Some of the previously prepared powder was sealed in moisture-proof containers and stored for six months at room temperature. At the end of this time, the whipping procedure was repeated with the following results:

| Time of whipping (min.): | Overrun (percent) |
|---|---|
| 3 | 197 |
| 5 | 234 |

It is manifest from this example that storage has only a minor effect upon the whipping properties of the powder, which is prepared in accordance with the present invention.

Example II

The same procedure, described in Example I was repeated except that the phosphoric acid esters were not incorporated into the topping mix. The emulsion separated into a fatty phase and an aqueous phase prior to spray drying and it was necessary to agitate the emulsion after homogenization to maintain a suitable state for spray drying. The powder therefrom, after storage at 30–40° F. for 5 days, was returned to room temperature and whipped with the cold milk. The following results were noted:

| Time of whipping (min.): | Overrun (percent) |
|---|---|
| 2 | 224 |
| 3 | 255 |
| 4 | 267 |

These results showed that the product may be prepared without the use of the phosphoric acid ester of mono-diglycerides, provided special processing precautions are observed, and that it whipped satisfactorily after its preparation and a five-day tempering period.

As in Example I, dry powder of this example was stored for six months. Its whippability after this storage period was measured as indicated herebelow.

| Time of whipping (min.): | Overrun (percent) |
|---|---|
| 3 | 150 |
| 5 | 150 |

It is evident that the whipped topping powder was relatively unstable over the storage period when the phosphoric acid ester of mono-diglycerides was omitted.

Accordingly, Examples I and II demonstrate that the use of a phosphoric acid ester of a mono- and diglyceride provides a superior end product. Without these phosphoric acid esters, the whipped topping powder has relatively poor stability under storage conditions. This is surprising in view of the large concentration of stabilizing agents which are employed. In contrast, the topping powder, with the phosphoric acid esters therein, has excellent stability.

Example III

A composition was prepared with the following ingredients and spray-dried as per Example I:

| | Parts |
|---|---|
| Cottonseed oil (65 I.V.) | 49.79 |
| Propylene glycol monostearate | 9.00 |
| Phosphoric acid esters of 65 I.V. cottonseed oil mono-diglycerides (PAEM) | 0.20 |
| Hydroxylated lecithin | 1.00 |
| Butylated hydroxyanisole | 0.01 |
| Sodium caseinate | 10.00 |
| Sucrose | 30.00 |

No problems were encountered in either preparing or spray-drying the emulsion. The powder therefrom was stored for six days at 35° F. and then for two days at room temperature. Subsequent to this storage, 70 grams of powder were whipped with ½ cup of cold milk and vanilla flavor. The results are as follows:

| Time of whipping (min.): | Overrun (percent) |
|---|---|
| 2 | 190 |
| 3 | 245 |
| 4 | 265 |

Although the texture and flavor of the whipped material of this example were different from those of the product in Example I, the topping was quite acceptable.

Example IV

A similar product was prepared as in Example III, except that additional sucrose was employed in lieu of the PAEM. The emulsion prepared for spray drying was relatively unstable and the necessary emulsification was maintained by physical means prior to the emulsion being forced through the spray-drier nozzle. After the storage period of 35° F. and at room temperature, a whipped topping was provided from the powder, and the following results were noted:

| Time of whipping (min.): | Overrun (percent) |
|---|---|
| 2 | 147 |
| 3 | 172 |
| 4 | 180 |

It can be seen from Examples III and IV that the omission of PAEM created certain process problems. It also resulted, in this instance, in an inferior end product.

Example V

A dry topping mix composition is prepared in the manner described in Example I, except that glyceryl monooleate is substituted for the glyceryl lactooleate. No difficulty is experienced with preparation of the emulsion prior to spray drying. The spray dried powdered topping mix obtained has excellent whipping characteristics as initially prepared and retains these characteristics with little loss over a storage period of 6 months.

Having set forth the general nature and specific embodiments of the present invention, the true scope is now particularly pointed out in the appended claims.

What I claim is:

1. A whippable topping mix which has improved stability for preparing a whipped topping that is similar to whipped cream which comprises a base fat, a water dispersible protein, a phosphoric acid ester of a glyceride and at least one emulsifier selected from (1), (2), and (3), where (1) consists of a partial ester of a glycol and a higher saturated fatty acid, (2) consists of a mixture of a lactylated glycerol ester of a saturated fatty acid and an ester of a polyhydric alcohol and an unsaturated fatty acid, and (3) consists of a mixture of a lactylated glycerol ester of a saturated fatty acid and a lactylated ester of a polyhydric alcohol and an unsaturated fatty acid.

2. A dry whippable topping mix which has improved storage stability for preparing a whipped topping that is similar to whipped cream which comprises a base fat, a water dispersible protein, phosphoric acid esters of glycerides, lactylated glyceryl oleate and a mixture of lactylated glycerol esters of a fatty acid selected from the group consisting of palmitic and stearic acids.

3. A dry whippable topping mix which has improved storage stability for preparing a whipped topping that is similar to whipped cream which comprises a base fat, a water dispersible protein, phosphoric acid esters of glycerides, and a partial ester of a glycol and a higher fatty acid.

4. A dry whippable topping mix which has improved storage stability for preparing a whipped topping that is similar to whipped cream which comprises a base fat; a sweetening agent; a water dispersible protein; a lecithin; phosphoric acid esters which are reaction products of a derivative of phosphorus with a glyceride selected from the group consisting of glycerides having a saturated fatty acid residue, glycerides having an unsaturated fatty acid residue, and mixtures of glycerides having both saturated and unsaturated fatty acid residues; a lactylated glyceryl oleate; and a mixture of lactylated glycerol esters of a fatty acid selected from the group consisting of palmitic and stearic acids.

5. A dry whippable topping mix which has improved storage stability for preparing a whipped topping that is similar to whipped cream which comprises a base fat, a sweetening agent, a water dispersible protein, a lecithin, a partial ester of a glycol and a higher fatty acid, and phosphoric acid esters which are reaction products of a derivative of phosphorus with a glyceride selected from the group consisting of glycerides having a saturated fatty acid residue, glycerides having an unsaturated acid residue and mixtures of glycerides having both saturated and unsaturated fatty acid residues.

6. The whippable topping mix according to claim 4 in which the derivative of phosphorus is selected from the group consisting of phosphorus pentoxide, pyrophosphoric acid, meta-phosphoric acid, phosphorus halides, ethyl meta-phosphate and phosphorus oxychloride.

7. The whippable topping mix according to claim 4 in which the fatty acid residue in the saturated glyceride is selected from the group consisting of stearic and palmitic residues and mixtures thereof.

8. The whippable topping mix according to claim 4 in which the fatty acid residue in the unsaturated glyceride is derived from an oil which has an iodine number of at least 50.

9. A dry whippable topping mix which has improved storage stability for preparing a whipped topping that is similar to whipped cream which comprises about 41.7 parts of hydrogenated peanut oil having an iodine value of about 65; about 41 parts sucrose; about 8 parts sodium caseinate; about 7 parts glyceryl lactopalmitate; about 1 part of lecithin; about 0.5 part of glyceryl lactooleate; and about 0.2 part of phosphoric acid ester of cottonseed oil mono- diglycerides having an iodine value of 65.

10. A dry whippable topping mix which has improved storage stability for preparing a whipped topping that is similar to whipped cream which comprises 49.79 parts of 65 I.V. cottonseed oil; 0.2 part of phosphoric acid ester of 65 I.V. cottonseed mono- diglycerides; 30.0 parts of sucrose; 10.0 parts of sodium caseinate; 9.0 parts of propylene glycol monostearate; 1.0 part of hydroxylated lecithin; and 0.01 part of butylated hydroxyanisole.

11. A process which comprises reacting glycerides with derivatives of phosphorus to form a mixture of phosphoric acid esters; and combining said phosphoric acid esters with a base fat, a water dispersible protein and a member selected from the group consisting of a partial ester of a glycol and a higher saturated fatty acid, a lactylated glycerol ester of a saturated fatty acid and an ester of a polyhydric alcohol and an unsaturated fatty acid, and a lactylated glycerol ester of a saturated fatty acid and a lactylated ester of a polyhydric alcohol and an unsaturated fatty acid to provide a stable whippable topping mix capable of being whipped to a stable whipped topping that is similar to whipped cream.

12. A process which comprises reacting glycerides having both saturated and unsaturated ester residues with derivatives of phosphorus to form a mixture of phosphoric acid esters; and combining said phosphoric acid esters with at least one other emulsifying agent selected from (1), (2) and (3), where (1) consists of a partial ester of a glycol and a higher saturated fatty acid, (2) consists of a mixture of a lactylated glycerol ester of a saturated fatty acid and an ester of a polyhydric alcohol and an unsaturated fatty acid, and (3) consists of a mixture of a lactylated glycerol ester of a saturated fatty acid and a lactylated ester of a polyhydric alcohol and an unsaturated fatty acid, a base fat and a water dispersible protein to provide a stable emulsion which is capable of being dried to form a dry whippable topping mix with improved storage stability and which is capable of being whipped to form a stable whipped topping that is similar to whipped cream.

13. A process which comprises reacting a glyceride having a saturated ester residue with a derivative of phosphorus to form a first phosphoric acid ester, reacting separately a glyceride having an unsaturated ester residue with a derivative of phosphorus to form a second phosphoric acid ester; combining said first phosphoric acid ester and said second phosphoric acid ester with at least one other emulsifying agent selected from (1), (2) and (3), where (1) consists of a partial ester of a glycol and a higher saturated fatty acid, (2) consists of a mixture of a lactylated glycerol ester of a saturated fatty acid and an ester of a polyhydric alcohol and an unsaturated fatty acid, and (3) consists of a mixture of a lactylated glycerol ester of a saturated fatty acid and a lactylated ester of a polyhydric alcohol and an unsaturated fatty acid, a base fat and a water dispersible protein to provide a stable emulsion which is capable of being dried to form a dry whippable topping mix with improved storage stability and which is capable of being whipped to form a stable whipped topping which is similar to whipped cream.

14. A stable whippable emulsion for preparing a whipped topping that is similar to whipped cream which comprises a base fat, a water dispersible protein, about 0.05% to 1% phosphoric acid esters of glycerides and at least one emulsifier selected from (1), (2) and (3), where (1) consists of a partial ester of a glycol and a higher saturated fatty acid, (2) consists of a mixture of a lactylated glycerol ester of a saturated fatty acid and an ester of a polyhydric alcohol and an unsaturated fatty acid, and (3) consists of a mixture of a lactylated glycerol ester of a saturated fatty acid and a lactylated ester of a polyhydric alcohol and an unsaturated fatty acid.

15. A stable dry whippable topping mix for preparing a whipped topping that is similar to whipped cream which comprises a base fat, a water dispersible protein, about 0.05% to 1% phosphoric acid esters of glycerides and at least one emulsifier selected from (1), (2) and (3), where (1) consists of a partial ester of a glycol and a higher saturated fatty acid, (2) consists of a mixture of a lactylated glycerol ester of a saturated fatty acid and an ester of a polyhydric alcohol and an unsaturated fatty acid, and (3) consists of a mixture of a lactylated glycerol ester of a saturated fatty acid and a lactylated ester of a polyhydric alcohol and an unsaturated fatty acid.

16. A stable whipped topping that is similar to whipped cream which comprises a base fat, a water dispersible protein, about 0.05% to 1% phosphoric acid esters of glycerides and at least one emulsifier selected from (1), (2) and (3), where (1) consists of a partial ester of a glycol and a higher saturated fatty acid, (2) consists of a mixture of a lactylated glycerol ester of a saturated fatty acid and an ester of a polyhydric alcohol and an unsaturated fatty acid, and (3) consists of a mixture of a lactylated glycerol ester of a saturated fatty acid and a lactylated ester of a polyhydric alcohol and an unsaturated fatty acid.

References Cited by the Examiner
UNITED STATES PATENTS

| | | | |
|---|---|---|---|
| 2,177,984 | 10/1939 | Harris | 260—403 |
| 2,683,694 | 7/1954 | Hoffman | 99—163 |
| 2,868,653 | 1/1959 | Diamond | 99—139 |
| 2,913,342 | 11/1959 | Cameron et al. | 99—139 X |
| 3,098,748 | 7/1963 | Noznick et al. | 99—139 X |

A. LOUIS MONACELL, *Primary Examiner.*

BEATRICE H. STRIZAK, *Examiner.*